C. H. ROBINSON.
BOLL WEEVIL REMOVING ATTACHMENT FOR CULTIVATORS.
APPLICATION FILED AUG. 26, 1915.

1,184,381.

Patented May 23, 1916.

Witnesses
H. B. Wooden
M. E. Tracy

C. H. Robinson
Inventor,
by C. A. Snow & Co.
Attorneys.

UNITED STATES PATENT OFFICE.

CARL H. ROBINSON, OF SNOW HILL, ALABAMA.

BOLL-WEEVIL-REMOVING ATTACHMENT FOR CULTIVATORS.

1,184,381. Specification of Letters Patent. Patented May 23, 1916.

Application filed August 26, 1915. Serial No. 47,480.

*To all whom it may concern:*

Be it known that I, CARL H. ROBINSON, a citizen of the United States, residing at Snow Hill, in the county of Wilcox and State of Alabama, have invented a new and useful Boll-Weevil-Removing Attachment for Cultivators, of which the following is a specification.

This invention relates to an attachment for cotton cultivators whereby boll weevils are knocked from the plants being cultivated and are thrown to position where they will be covered by the loosened soil so as thus to be destroyed.

A further object of the invention is to provide an attachment of this character which can be applied readily to a cotton cultivator and which is light and simple in construction and will operate to not only dislodge the boll weevils and squares, but to also throw them laterally where they will be covered by the overturned soil.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
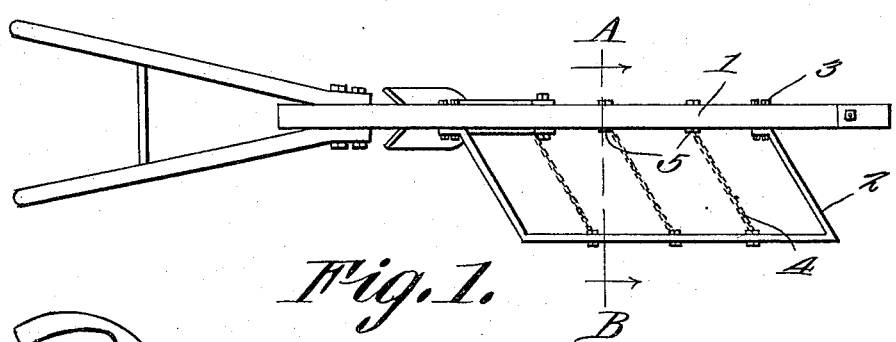
Figure 2:
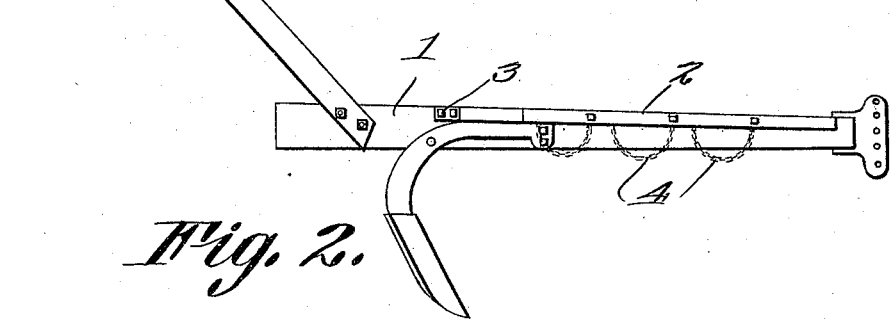
Figure 3:
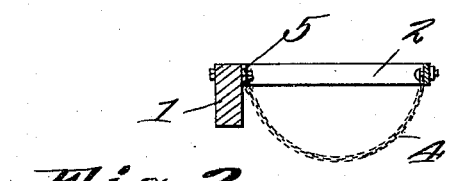

In said drawings:—Figure 1 is a plan view of a cultivator having the present improvements combined therewith. Fig. 2 is a side elevation. Fig. 3 is a section on line A—B Fig. 1.

Referring to the figures by characters of reference 1 designates the beam of a plow of any preferred form. The attachment constituting the present invention is adapted to be connected to one side of this beam and includes a frame 2 preferably formed of a metal strip bent to form obliquely disposed front and rear portions, while the intermediate or side portion is parallel with the beam 1. The front and back portions of the frame are secured to the beam 1 by means of bolts 3 extending transversely through the beam, or in any other suitable manner. Connected to the outer side of frame 2 is a series of chains 4 the inner ends of which are secured to the beam 1 in any manner desired, preferably by means of bolts 5 extending through the beam. The chains 4 are preferably arranged in vertical planes parallel with the front and back ends of the frame 2 and said chains and ends of the frame are extended forwardly and laterally away from the beam.

The parts are so proportioned that when the plow is drawn along the side of a row of cotton plants, the frame 2 will overhang said row, while the chains 4 and the frame will engage the plants and knock the squares and boll weevils therefrom, the peculiar angle at which the chains and the end of the frame are disposed resulting in deflecting the squares and boll weevils laterally away from the plants and onto the ground where they will be covered by the overturned soil loosened by the plow. Consequently the squares and boll weevils will thus be destroyed by being buried in the ground.

Obviously the device herein described can be attached readily to plows and cultivators of different forms and is advantageous not only because of the ease with which it may be applied, but also because of its simplicity, cheapness of manufacture, and the efficient manner in which it will operate to remove the objectionable squares and the boll weevils from the plants.

What is claimed is:—

1. The combination with the beam of a plow, of a frame fixedly connected to and extending laterally from the beam, and diagonally disposed flexible means suspended between the beam and the outer side of the frame for striking plants and deflecting boll weevils inwardly into the path of the soil loosened by the plow.

2. An attachment for plow beams including a frame, means for attaching the frame rigidly to one side of a beam, and flexible elements suspended from intermediate portions of the frame and adapted to be secured to one side of a beam.

In testimony that I claim the foregoing as my own, I have hereto affixed my signature in the presence of two witnesses.

CARL H. ROBINSON.

Witnesses:
L. W. SIMPSON,
M. McCANDICHU.

Copies of this patent may be obtained for five cents each, by addressing the "Commissioner of Patents, Washington, D. C."